A. H. MERRILL.
COOKING UTENSIL.
APPLICATION FILED MAY 6, 1909.
945,105.
Patented Jan. 4, 1910.
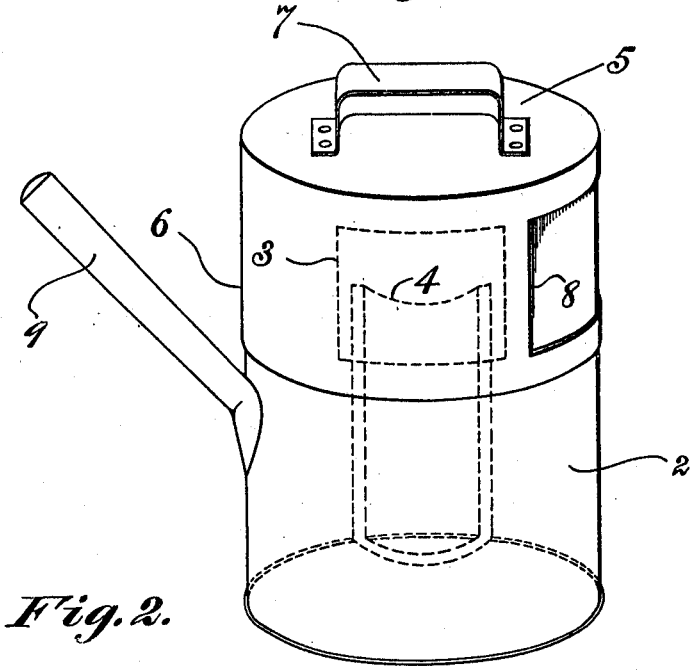
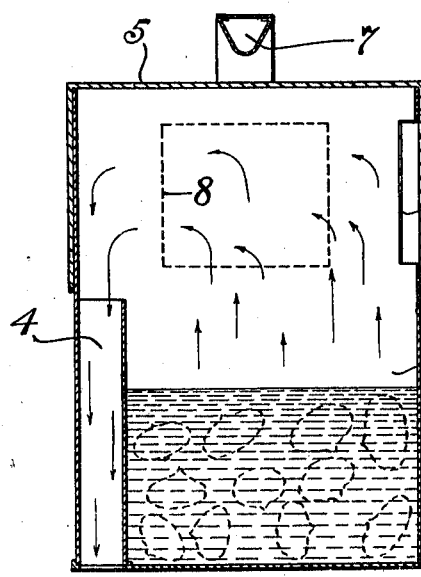
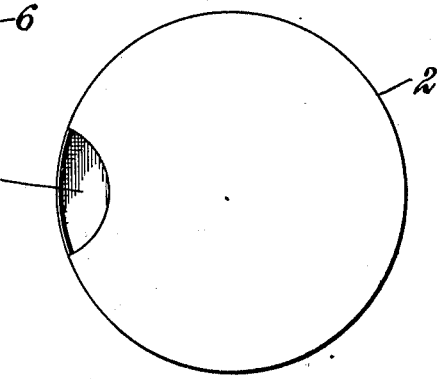
Witnesses:
Inventor:
Arthur H. Merrill
By his Attorneys,

UNITED STATES PATENT OFFICE.

ARTHUR H. MERRILL, OF HARTFORD, CONNECTICUT.

COOKING UTENSIL.

945,105.  Specification of Letters Patent.  Patented Jan. 4, 1910.

Application filed May 6, 1909. Serial No. 494,427.

*To all whom it may concern:*

Be it known that I, ARTHUR H. MERRILL, citizen of the United States, residing at Hartford, in the county of Hartford and State of Connecticut, have invented certain new and useful Improvements in Cooking Utensils, of which the following is a specification.

This invention relates to cooking utensils the object of the invention being to provide a simple device of this character which can be inexpensively and readily made and in which foods of various kinds can be cooked without possibility of emitting odors in the room in which said utensil or vessel may be located.

Said utensil comprises other features of advantage which with the foregoing will be set forth at length in the following description wherein I outline in detail that form of embodiment of the invention which I have selected for illustration in the drawings accompanying and forming part of the present specification.

Said utensil involves a cooking chamber, a flue for leading off vapors from the interior of the said utensil to a point outside the same, and a normally closed dome for said chamber, said utensil having a regulable opening which as will be obvious may be opened or closed at will all as will hereinafter more particularly appear.

Referring to said drawings, Figure 1 is a perspective view of a cooking utensil involving my invention, Fig. 2 is a central, vertical section of the same, the section being taken through the inner flue, and, Fig. 3 is a bottom plan view of said utensil.

The utensil comprises in its make up a vessel as 2 which may be made of any suitable material or shape although I find that said vessel can be cheaply made from tin and the same is generally made cylindrical. The lower portion of this vessel 2 constitutes the cooking chamber or space of the utensil. The cylindrical body or upright portion of the vessel 2 is shown as having a side opening 3 and although this opening may be of any desirable shape it is shown as being rectangular. Within the vessel 2 is a flue both the upper and lower ends of which are open, the lower end of said flue opening into the bottom of said vessel 2 while the upper end thereof is situated above the normal level of the contents of said vessel although it is preferably slightly below the lower edge of the opening 3 for a purpose that will hereinafter appear. At this point it should be stated that the vessel 2 fits the usual opening in the top of a stove or range and the vapors that are evolved in cooking vegetables or the like therein follow the arrows in Fig. 2 and enter the upper open or receiving end of the interior flue or duct 4 and are drawn down said duct into the fire box of the stove by the suction of the draft of said stove, it being understood that the vessel 2 is normally closed the upper portion thereof being in the nature of a closed dome all as will hereinafter more fully appear.

The cover for the receptacle or vessel 2 is designated by 5 and in the present case it has a depending annular or cylindrical flange or apron 6 which closely fits the upper portion of the cylindrical body of the vessel 2. The cover or cap 5 is shown as having on its upper side a bail or handle 7 by which its turning or removal may be facilitated. The upper portion of the body of the vessel 2 and the cover 5 with the flange of the latter present the dome-like upper portion of the utensil to which I have alluded and this dome-like, normally closed portion prevents normally the escape of the vapors from the receptacle except by way of the discharge flue 4. The pendent flange 6 has an opening 8 the area of which is substantially the same as that of the opening 3 and the two openings can be put into register by turning the cover 5. During cooking the solid portion of the cover or flange 6 thereof will close the inner opening 3 so as to effectually close in the upper portion of the utensil and thereby cause any vapors which are generated during cooking to enter the inlet end of the discharge flue or duct 4. Should it be desired to obtain access to the interior of the utensil for the purpose of ascertaining whether or not a vegetable is cooked or otherwise the cap or cover 5 is turned so as to bring the opening 8 into register with the opening 3 at which time a fork or the hand can be introduced into the utensil for the purpose stated. I prefer that said openings in practice be made sufficiently large to receive the hand. It will be remembered that the lower edge of the opening 3 is stated as being above the entering end of the flue or discharge duct 4 and by virtue of this fact I find that when the opening 3 is uncovered during cooking all vapors will be positively caused to enter said flue while none will enter the room this function being aided by the fact that the opening 3 is situated diametrically opposite the flue 4 although I prefer to prevent absolutely the trace of any odor from the cooking to keep the opening 3 shut during cooking. When the vegetable or other article in the utensil has been cooked it may be necessary to drain off water therefrom and this can be easily accomplished without possibility of discharging any of the vegetable, by so turning the cover 5 that its flange 6 will be caused to partially uncover the opening 3 at which time the desired object can be secured by pouring off the water the user assuring himself that the opening is not large enough for the passage of the vegetable. The only time during the cooking of a vegetable when it is necessary to wholly remove the cover 5 is when the vegetable is being introduced into the utensil and there are certain vegetables, such as onions, where even this is not necessary for the onions can be introduced into the receptacle simply through the opening 3 the cover 5 of course being turned sufficiently to put the opening 8 thereof into full register with said opening 3. I have found in practice that I can cook cabbage, onions, etc., within the utensil when the same is closed in as hereinbefore described without possibility of their cooking being detected and no odor therefrom arises when the opening 3 is uncovered for the outside air positively forces the vapors to enter the upper end of the flue 4.

From the foregoing description it will be clear that my cooking utensil comprises a substantially-cylindrical vessel provided with a flue leading from the interior toward the exterior thereof, and a substantially-cylindrical cover for said vessel, said vessel and cover having lateral openings and said cover being turnable on the vessel to put said openings into and out of register and being also removable.

The parts may be all made of tin and all parts are preferably curved in form so that there are no angles presented in which dirt can lodge or accumulate. Then also the cap or cover owing to its shape effectually and materially reinforces the upper portion of the utensil. What I have termed the "vessel" 2 may be equipped with a handle 9 by which the utensil as a whole may be moved from place to place.

I do not restrict myself to the exact construction hereinbefore described for certain changes may be made within the scope of my invention as expressed by my claim.

What I claim is:

A cooking utensil comprising a substantially-cylindrical vessel provided with a flue leading from the interior toward the exterior thereof, and a substantially-cylindrical cover for said vessel, said vessel and cover having lateral openings and said cover being turnable on the vessel to put said openings into and out of register and said cover when the openings are out of register, constituting a valve for the opening in the vessel and being also removable from said vessel.

In testimony whereof I affix my signature in presence of two witnesses.

ARTHUR H. MERRILL.

Witnesses:
   HEATH SUTHERLAND,
   F. E. ANDERSON.